3,836,629
METHOD OF INHIBITING THE GROWTH OF LARVAE AND NYMPHS WITH AZASTEROIDS

Paul D. Klimstra, Northbrook, Ill., assignor to G. D. Searle & Co., Chicago, Ill.
No Drawing. Continuation-in-part of abandoned application Ser. No. 124,499, Mar. 15, 1971. This application Aug. 17, 1972, Ser. No. 281,492
Int. Cl. A01n 9/20
U.S. Cl. 424—238         1 Claim

ABSTRACT OF THE DISCLOSURE

Described herein is a method of inhibiting the growth of larvae or nymphs of an insect which converts dietary $C_{28}$ and $C_{29}$ phytosterols to cholesterol or which utilizes dietary cholesterol in its metabolism by administering to said larvae or nymphs an effective amount of a hypocholestrolemic 3-etherified or 3-acylated 3-hydroxyazasteroid. New 3-cycloalkoxy, 3-(cycloalkyl)alkoxy and 3-(cycloalkyl)alkanoyloxy derivatives of 17β-[(N-alkyl-N-dialkylaminoalkyl)amino]androst-5-en-3-ols, corresponding saturated compounds and related monoazasteroids are also described. The subject compounds can be prepared by etherification or acylation of the corresponding 3-hydroxyazasteroids or by addition of the 17-side chain to the corresponding 3-etherified or 3-acylated 17-keto compounds. Anti-larval and anti-nymphal compositions containing the subject compounds are described also.

---

This application is a continuation-in-part of my copending application Ser. No. 124,499, filed Mar. 15, 1971 and now abandoned.

The present invention concerns new compounds, new compositions and new processes for controlling insects in their preliminary developmental stages using hypocholesterolemic 3-etherified azasteroids and 3-acyloxyazasteroids. The term "azasteroid" used here and throughout this specification indicates a steroid having a nitrogen-containing cholesterol or cholesterol-like side chain attached to carbon atom 17 of the steroid nucleus.

Various biological and chemical methods have been used to control unwanted insects. Some of these methods include reproductivity control and chemical control. Reproductivity control may involve the use of organic compounds to produce varying degrees of sterilization in insects and when used as such are called chemosterilants. Strict chemical control involves the use of various chemicals such as stomach poisons, contact poisons, systemic poisons, fumigants, repellents or attractants. A recent suggestion for the control of insects would involve the use of chemicals which selectively interfere with development in the preliminary development stages.

Certain non-steroidal and 3-hydroxysteroidal hypocholesterolemic agents have been reported to inhibit the growth of larvae of insects which convert phytosterols to cholesterol. Triparanol and 22,25-diazacholesterol inhibit the growth of the tobacco hornworm [*Manduca sexta* (Johannson)], Svoboda and Robbins, *Science* 156, 1637. (1967). 25-Azacholesterol and 20,25 diazacholesterol inhibit the growth of the boll weevil (*Anthonomus grandis*, Boheman) larvae, Earle et al., *J. Econ. Entomol.* 60, 291 (1967).

It has now been surprisingly found that hypocholesterolemic 3-etherfied and 3-acylated 3-hydroxyazasteroids are potent inhibitors of the growth of larvae and nymphs of insects which convert dietary phytosterols to cholesterol or which utilize dietary cholesterol in their metabolism. This discovery is surprising because although the activity of 3-hydroxyazasteroids as hypocholesterolemic agents appears to parallel their activity as anti-larval and anti-nymph agents, a considerable increase in potency as anti-larval and anti-nymphal agents appears to be found with hypocholesterolemic 3-etherified and 3-acylated 3-hydroxyazasteroids as compared to the parent alcohols. This increase in potency is surprising in view of the apparent lack of change or decrease in hypocholesterolemic activity following etherification or esterification of a 3-hydroxyazasteroid.

The present invention thus relates to a method of inhibiting the growth of larvae or nymphs of an insect which converts dietary phytosterols to cholesterol or which can utilize dietary cholesterol in its metabolism, which method comprises the administration to said larvae or nymphs of an effective amount of a hypocholesterolemic 3-etherified or 3-acylated 3-hydroxyazasteroid.

The term "hypocholesterolemic 3-etherified or 3-acylated 3-hydroxyazasteroid" used here means a compound having the skeleton

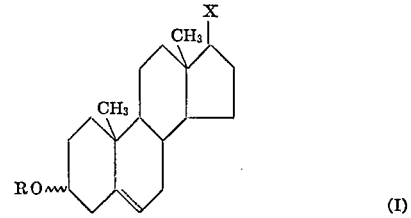

(I)

which is active as a hypocholesterolemic agent, particularly in the standard hypocholesterolemic assay involving treatment of male rats made hypercholesterolemic and hypothyroid with propylthiouracil.

In the foregoing formula, the broken line indicates the optional presence of a $\Delta^{5(6)}$ unsaturated linkage; the wavy line at the 3 position indicates the alternative $\alpha$ and $\beta$ configurations; R is a hydrocarbon grouping containing 1 to 19 carbon atoms or an acyl radical derived from a hydrocarbon carboxylic acid containing 1 to 18 carbon atoms; and X is a saturated radical containing 1 or 2 nitrogen atoms and at least 4 carbon atoms.

In addition to the substituents shown on the skeleton of formula (I), various groups can be substituted at the 1, 2, 6 and 11 positions without affecting the hypocholesterolemic potency of the compounds involved. For example, the 1 position can be substituted by a hydroxy or acyloxy grouping; the 2 position can be substituted by a lower alkyl grouping; the 6 position can be substituted by a lower alkyl grouping; and the 11 position can be substituted by a hydroxy or acyloxy grouping.

The hydrocarbon groupings containing 1 to 19 carbon atoms which are encompassed by R include alkyl radicals containing 1 to 12 carbon atoms, such as methyl, ethyl, propyl, butyl, pentyl, hexyl, heptyl, octyl, nonyl, decyl, undecyl, dodecyl, and the branched-chain isomers thereof; cycloalkyl radicals containing 3 to 7 carbon atoms, such as cyclopropyl, cyclobutyl, cyclopentyl, cyclohexyl and cycloheptyl; and (cycloalkyl)alkyl radicals containing 4 to 19 carbon atoms, wherein the terms "cycloalkyl" and "alkyl" are defined as before.

The hydrocarbon carboxylic acids containing 1 to 18 carbon atoms from which the acyl radicals which are encompassed by R can be derived include saturated and unsaturated aliphatic hydrocarbon carboxylic acids having the stated number of carbon atoms. Illustrative of such acids are alkanoic acids such as acetic, propionic, butyric, isobutyric, *tert*-butylacetic, valeric, isovaleric. caproic, caprylic, decanoic, dodecanoic, myristic, palmitic, steric; alkenoic acids such as acrylic, crotonic and oleic; alkynoic acids such as hexynoic and octynoic; cycloalkanecarbaxoylic acids and cycloalkenecarboxylic acids, such as cyclopropanecarboxylic, cyclobutanecarboxylic, cyclopentanecarboxylic, cyclopentenecarboxylic. cyclohexanecarboxylic, and dimethylcyclohexanecarboxylic; and (cycloalkyl)alkanoic acids such as cyclopentylalkanoic acids (for example, cyclopentylacetic, cyclopentylpropionic, cyclopentylbutyric and cyclopentylvaleric), cyclohexylalkanoic acids, and cycloheptylalkanoic acids. When R is a (cycloalkyl)alkanoyl radical, i.e. when the acyl radical is that of a (cycloalkyl)alkanoic acid, said radical contains 5 to 18 carbon atoms. The cycloalkyl portion of that (cycloalkyl)alkanoyl radical contains 3 to 7 carbon atoms, while the alkanoyl portion contains 2 to 11 carbon atoms.

Equivalent to the free bases of formula (I) for the purposes of this invention are the acid addition salts thereof. Such salts include those derived from pharmacologically acceptable acids such as sulfuric, hydrochloric, nitric, phosphoric, lactic, benzoic. methanesulfonic, p-toluenesulfonic, salicylic, acetic, propionic, maleic, malic, tartaric, citric, cyclohexylsulfamic, succinic, nicotinic, ascorbic acid and the like.

An especially useful group of compounds within formula (I) above can be represented by the structural formula

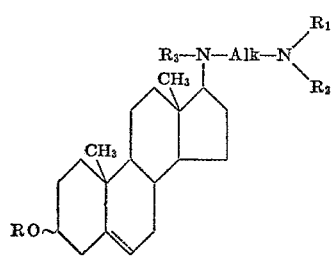

(II)

wherein the wavy and broken lines and R are defined as before; $R_1$ and $R_2$ are lower alkyl radicals of from 1 to 8 carbon atoms; $R_3$ is hydrogen or a lower alkyl radical of from 1 to 8 carbon atoms; and Alk is a lower alkylene radical containing 1 to 8 carbon atoms and separating the —$NR_1R_2$ and $R_3N$— groupings by at least 1 carbon atom. The lower alkyene radicals encompassed by the foregoing formula include methylene, ethylene, trimethylene, tetramethylene, pentamethylene, and the branched-chain isomers thereof. The compounds of the foregoing formula (II) wherein R is a lower alkanoyl radical are described in U.S. Pat. No. 3,084,156, issued Apr. 2, 1963. Representative species of the type described in that patent are 17β-[N-methyl-N-(3 - dimethylaminopropyl)amino]-androst-5-en-3β-ol 3-acetate; 17β-[N-(3 - dimethylaminopropyl)amino]-5α-androstan-3β-ol 3-acetate and the corresponding dihydrochloride; and 17β-[N - (3 - dimethylaminopropyl)amino]-5α-androstan-3β-ol 3-propionate.

A particularly preferred group of compounds within the scope of formula (II) are the compounds wherein $R_3$ is methyl and Alk is trimethylene, especially where $R_1$ and $R_2$ are methyl, and especially where R is a cycloalkyl radical or where R is the residue of a cycloalkylalkanoic acid. Preferred species include 17β-[N-methyl-N-(3-dimethylaminopropyl)amino]androst-5-en - 3β - ol 3-(3-cyclopentylpropionate), the corresponding hydrochloride, and 17β-[N-methyl - N - (3 - dimethylaminopropyl)amino]androst-5-en-3β-ol 3-cyclopentyl ether.

Another preferred group of compounds encompassed by formula (II) consists of the compounds wherein Alk is ethylene or trimethylene; $R_1$, $R_2$ and $R_3$ are methyl; and R is a lower alkyl radical. Preferred species within this group include 17β-[N-methyl-N-(3-dimethylaminopropyl)amino]androst-5-en - 3β - ol 3 - methyl ether and 17β-ol 3-methyl ether, particularly in the form of their dihydrochloride monohydrate salts.

Another preferred group of compounds within formula (I) for use in the instant invention is represented by the general formula

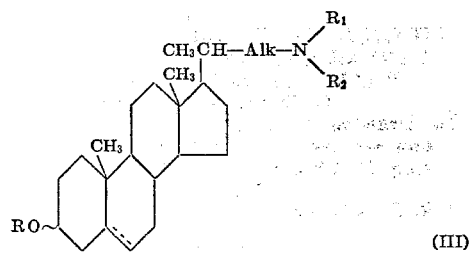

(III)

wherein the wavy and broken lines and R are defined as with formula (I); $R_1$ and $R_2$ are defined as with formula (II); and Alk is a lower alkylene radical containing 1 to 8 carbon atoms and separating the —$NR_1R_2$ and $CH_3CH$— functions by at least 1 carbon atom. Compounds of this formula or starting materials therefore are described in the literature, for example in U.S. Pat. No. 3,257,384 issued June 21, 1966, U.S. Pat. No. 3,144,471 issued Aug. 11, 1964 and U.S. Pat. No. 3,326,758 issued June 20, 1967 and in J. Med. Chem. 8, 45 (1965). Representative species encompassed by formula (III) include 3β-acetoxy-24-dimethylamino - 5 - cholene and other 3β-acyloxy-24-dialkylamino-5-cholenes such as the 3β-acetates, 3β-propionates, 3β-isobutyrates. 3β-caprylates and 3β-octanoates of 24-diethylamino-, 24-diisopropylamino-, 24 - dibutylamino-, 24 - diisobutylamino-, and 24-dioctylamino-3β-hydroxy-5-cholene.

A particularly preferred group of compounds within the scope of formula (III) consists of the compounds wherein $R_1$ and $R_2$ are methyl and R is a cycloalkyl or (cycloalkyl)alkanoyl radical. Preferred species include 24-dimethylaminochol-5-en-3β-ol 3 - (3 - cyclopentylpropionate) and 24-dimethylaminochol-5-en-3β-ol 3 - cyclopentyl ether.

Still another preferred group of compounds within the scope of formula (III) consists of the compounds wherein $R_1$ and $R_2$ are methyl and Alk is ethylene. An especially preferred compound of this type is 23-dimethylamino-24-norchol-5-en-3β-ol 3-methyl ether.

Yet another preferred group of compounds encompassed by formula (I) for use in the instant invention consists of compounds of the formula

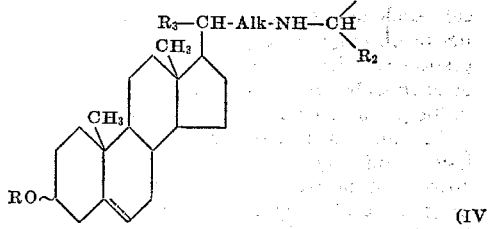

(IV)

wherein the wavy and broken lines and R are defined as for the compounds of formula (I) above; $R_1$, $R_2$ and $R_3$ are defined as for the compounds of formula (II); and Alk is a lower alkylene radical containing 1 to 8 carbon atoms and separating the adjacent 20-carbon atom and nitrogen atom by at least 1 carbon atom. A particularly preferred group of compounds within this structural formula consists of the compounds wherein Alk is ethylene. A number of the parent alcohols, 3-alkyl ethers of 1 to 4 carbon atoms and 3-acyl esters having 1 to 18 carbon atoms of these compounds are described in J. Med. Chem., 8, 45 (1965) and in U.S. Pat. No. 3,326,758.

Also within the scope of formula (I) is another preferred group of compounds for use in the invention, which group can be represented by the formula

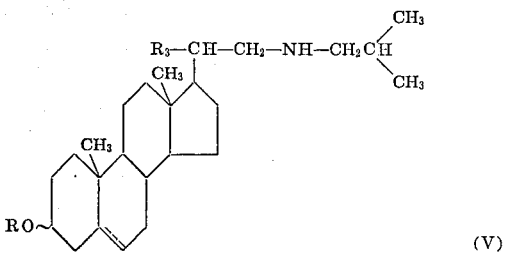

(V)

wherein the wavy and broken lines and R are defined as for the compounds of formula (I); and $R_3$ is defined as for the compounds of formula (II). The parent alcohol wherein $R_3$ is a methyl radical is described in *J. Med. Chem.* 8, 45 (1965).

The novel compounds of this invention have the formula

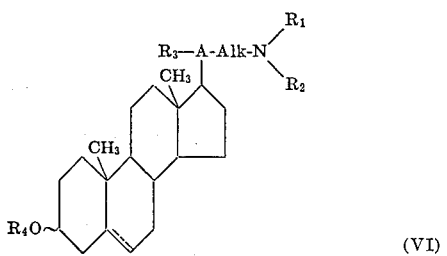

(VI)

wherein $R_1$, $R_2$, $R_3$ and the broken and wavy lines are defined as before; Alk is a lower alkylene radical containing 2 to 8 carbon atoms and separating the —$NR_1R_2$ and $R_3A$— groupings by at least two carbon atoms; A is —CH— or a nitrogen atom; and $R_4$ is a cycloalkyl, (cycloalkyl)alkyl or (cycloalkyl)alkanoyl radical; with the proviso that when $R_3$ is methyl, A is —CH—, Alk is trimethylene and the 5(6) linkage is saturated, $R_4$ is a cycloalkyl or (cycloalkyl)alkyl radical.

The preferred novel compounds of this invention can be represented by the general structural formula

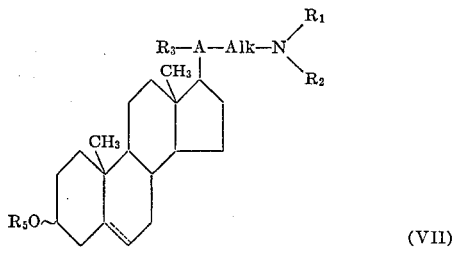

(VII)

wherein $R_1$, $R_2$, $R_3$, Alk and the broken and wavy lines are defined as with formula (VI); A is —CH— or a nitrogen atom; and $R_5$ is a cycloalkyl, (cycloalkyl) alkyl or (cycloalkyl)alkanoyl radical; with the proviso that when A is —CH— and the 5(6) linkage is saturated, $R_5$ is a cycloalkyl or (cycloalkyl)alkyl radical.

In addition to their hypocholesterolemic and antilarval and anti-nymphal activity, the novel compounds of formula (VI) also possess other valuable biological properties. Thus, for example, these compounds exhibit antibiotic activity as is evidenced by their ability to inhibit the growth of bacteria; protozoa. *e.g. Tetrahymena pyriformis* and *Trichomonas vaginalis;* fungi, *e.g. Trichophyton mentagrophytes;* and algae, *e.g. Chlorella vulgaris.*

Suitable starting materials for the manufacture of the compounds of formula (I) are the 3α- and 3β-isomers of the structural formula

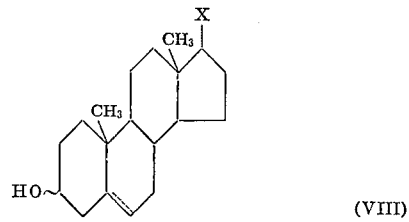

(VIII)

wherein X and the broken and wavy lines are defined as before. The compounds of formula (VIII) above wherein X is

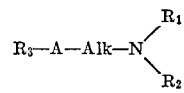

wherein A, $R_3$, Alk, $R_1$, and $R_2$ are defined as with formula (VI) are suitable starting materials for use in the manufacture of the novel compounds of formula (VI).

The 3-acylates of the 3-hydroxy compounds of formula (VIII) can be obtained by reacting the desired 3-hydroxy compound with the appropriate acid halide or acid anhydride in the presence of a tertiary amine such as pyridine. When the compounds of formula (I) wherein R is a (cycloalkyl)alkanoyl radical are desired, the preferred acylating agent is a (cycloalkyl)alkanoyl chloride. Acylating agents of that type can be manufactured by classical methods, for example, by reacting the appropriate (cycloalkyl)alkanoic acid with thionyl chloride.

The 3-ethers of the 3-hydroxy compounds of formula (VIII) can be obtained by a number of alternative routes. One such method involves the reaction of an alcohol of formula (VIII) with the dimethyl or diethyl ketal of the appropriate ketone. Those ketal starting materials can be conveniently produced by reacting the selected ketone, *e.g.* cyclopentanone, with trimethyl- or triethylformate. Reaction of the steroidal alcohol with the ketal affords the corresponding 3-alkenyloxy, cycloalkenyloxy, or (cycloalkenyloxy steroid wherein the double bond in the 3-substituent is located between the carbon atom attached to the oxygen atom and the next adjacent carbon atom. Subsequent hydrogenation, which can be suitably effected using molecular hydrogen in the presence of an appropriate hydrogenation catalyst, until the uptake of one mole of hydrogen is complete, affords the desired 3-ether of formula (I).

An alternative method for the preparation of the 3-ethers of formula (I) comprises the reaction of an alcohol of formula (VIII) with the appropriate alcohol of the formula ROH wherein R is as defined for formula (I), in the presence of a small quantity of an acid such as *p*-toluenesulfonic acid, in an inert solvent such as benzene, toluene or the like.

Another alternative route to the 3-ethers begins with the reaction of a steroidal alcohol of formula (VIII) with an aryl or alkyl sulfonyl halide or with an aryl or alkyl sulfonic anhydride. Especially useful for this purpose are *p*-tolylsulfonyl chloride and methylsulfonyl chloride. The resultant 3-arylsulfonyl or 3-alkylsulfonyl steroid is then reacted with an alcohol or the formula ROH wherein R is defined as above, in the presence of a suitable acid acceptor, thus affording the desired 3-ethers.

An alternative method for the manufacture of the compounds of formula (I) being with the esterification or etherification of a 3α- or 3β-isomer of 3-hydroxyandrost- 5-en-17-one or of 3-hydroxyandrostan-17-one to form a compound of the formula

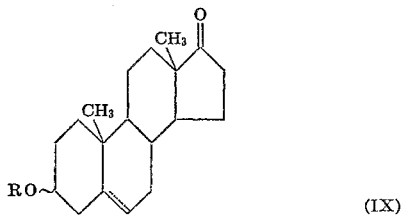

wherein R and the wavy and broken lines are defined as before. The esterification and etherification can be carried out according to the methods hereinabove described for the preparation of the 3-acylates and 3-ethers of the 3-hydroxy compounds of formula (VIII). Typical of the esterification procedure is the reaction of 3β-hydroxyandrost-5-en-17-one with 3-cyclopentylpropionyl chloride in pyridine to afford 3β-(3-cyclopentylpropionyloxy)androst-5-en-17-one. An example of a suitable etherification procedure is the reaction of 3β-hydroxyandrost-5-en-17-one with cyclopentanone diethyl ketal to afford 3β-(1-cyclopentenyloxy)androst-5-en-17-one, which is then reacted with hydrogen gas in the presence of a palladium on aluminum oxide catalyst to afford 3β-cyclopentyloxyandrost-5-en-17-one.

Formation of the compounds of formula (IX) is followed by addition of the 17-side chain by procedures analogous to those which have been previously employed in the preparation of the prior art 3-hydroxysteroids, thus affording the desired compounds of formula (I). A preferred procedure of this type which is useful in the preparation of the compounds of formula (II), i.e. the compounds wherein the 17-substituent is

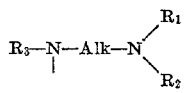

wherein $R_1$, $R_2$, $R_3$ and Alk are as defined for formula (II), comprises condensation of a 17-ketone of formula (IX) with the appropriate dialkylaminoalkylamine in the presence of an acidic catalyst to afford the corresponding imines. The imines which can be represented by the structural formula

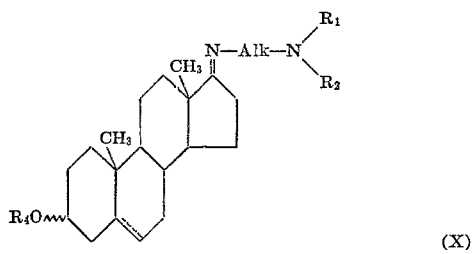

wherein $R_1$, $R_2$, $R_4$, and the wavy and broken lines are defined as with formula (VI), are novel intermediates useful in the preparation of the novel compounds of formula (VI) wherein A is a nitrogen atom. Examples of imine formation are the reactions of 3-dimethylaminopropylamine with 3β-(3-cyclopentylpropionyloxy)androst-5-en-17-one, and with 3β-cyclopentyloxyandrost-5-en-17-one, in the presence of p-toluenesulfonic acid monohydrate, to afford, respectively, 17-[N-(3-dimethylaminopropyl)imino]androst - 5 - en-3β-ol 3-(3-cyclopentylpropionate) and 17-[N-(3-dimethylaminopropyl)imino]androst-5-en-3β-ol 3-cyclopentyl ether.

Reduction of the imines, for example, by treatment with a suitable chemical reducing agent such as sodium borohydride, produces the corresponding compounds of formula (II) wherein $R_3$ is hydrogen. When the particular imines depicted by formula (X) are utilized, the novel compounds of formula (VI) wherein $R_3$ is hydrogen and A is nitrogen are produced. The reduction process is illustrated by the treatment of the specific imines named in the preceding paragraph with sodium borohydride to afford 17β-[N-(3 - dimethylaminopropyl)amino]androst-5-en-3β-ol 3-(3-cyclopentylpropionate) and 17β-[N-(3-dimethylaminopropyl)amino]androst - 5 - en-3β-ol 3-cyclopentyl ether.

The compound of formula (II) wherein $R_3$ is hydrogen and those of formula (VI) wherein $R_3$ is hydrogen and A is nitrogen can be conveniently alkylated to afford the corresponding compounds wherein $R_3$ is alkyl. When the compounds wherein $R_3$ is methyl are desired, alkylation is suitably effected by use of formic acid and formaldehyde. Thus, for example, reductive methylation of the specific compounds named in the preceding paragraph with formic acid and formaldehyde yields 17β-(N-methyl-N-(3-dimethylaminopropyl)amino]androst-5-en-3β-ol 3-(3-cyclopentylpropionate) and 17β-[N-methyl-N-(3-dimethylaminopropyl)amino]androst - 5 - en-3β-ol 3-cyclopentyl ether. However, a preferred procedure for the preparation of those compounds of formulas (II) and (VI) wherein $R_3$ is an alkyl radical containing more than one carbon atom involves acylation of the corresponding compounds wherein $R_3$ is hydrogen, suitably with a lower alkanoic acid anhydride or acid chloride in pyridine, followed by reduction of the resulting amide, for example with lithium aluminum hydride.

An alternate process for the preparation of the compounds of formula (III) and of the compounds of formula (VI) wherein A is —CH— utilizes starting materials of the partial structural formula

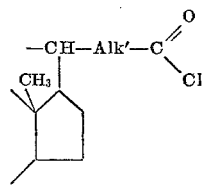

wherein Alk' is an alkylene radical containing 0 to 7 carbon atoms. Those acid chlorides can be readily prepared by treating the corresponding carboxylic acids with thionyl chloride in the presence of pyridine. Reaction of the acid chloride with an appropriate secondary amine of the formula $R_1R_2NH$ where in $R_1$ and $R_2$ are as hereinbefore defined affords the corresponding N,N-disubstituted amides. Those amides are then reduced, for example with lithium aluminum hydride in the presence of an inert solvent to afford the desired amines.

Yet another process for the preparation of the compounds of formula (III) and of the compounds of formula (VI) wherein A is —CH— employs staring materials of the partial structural formula

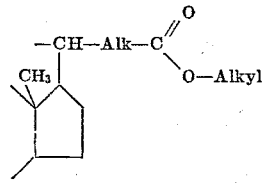

wherein Alk is an alkylene radical containing 0 to 8 carbon atoms. Starting materials of this type can be prepared by known methods; as a specific example, esterification of 3β-hydroxychol-5-en-24-ic acid with methanol in HCl affords 3β-hydroxychol-5-en-24-ic acid methyl ester, which is then reacted with tosyl chloride in pyridine, followed by refluxing the resultant 3-tosyl steroid in methanol to afford 3β-methoxychol-5-en-24-ic acid methyl ester. The esters of the partial formula depicted above are then subjected to the Curtius Rearrangement. Thus, those starting materials are reacted with hydrazine to afford the corresponding steroidal hydrazides, which are converted by treatment with cold nitrous acid in a suitable solvent to the corresponding steroidal acid azides. Those azides are then allowed to rearrange in an inert solvent, if necessary with the application of heat, until the evolution of nitrogen gas has ceased. The resultant steroidal isocyanates are then converted to the corresponding primary amines by an appropriate method, for example hydrolysis in the presence of acid or base. Those amines can then be converted to the corresponding tertiary amines of formulas (III) and (VI), i.e., the compounds of the partial structural formula

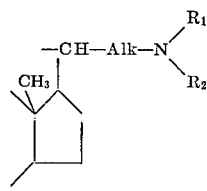

wherein Alk is an alkylene radical containing 1 to 8 carbon atoms and $R_1$ and $R_2$ are alkyl radicals containing 1 to 8 carbon atoms, by known methods. Thus, for example, the resultant primary amines can be subjected to reductive methylation by treatment with formic acid and formaldehyde to afford the corresponding compounds of formulas (III) and (VI) where $R_1$ and $R_2$ are methyl radicals.

An alternate route to the 5α-androstanes of formula (I) involves hydrogenation of the corresponding androst-5-enes. Preferably the hydrogenation is carried out catalytically in the presence of a hydrogenation catalyst, e.g. platinum, palladium-on-charcoal, platinum oxide and the like.

Tests to determine the action of azasteroids on insects suggest that the hypocholesterolemic azasteroids of formula (I) are active against larvae and nymphs of phytophagous, saprophagous, and zoophagous insects which obtain their essential cholesterol either from dietary cholesterol or through the dealkylation of dietary phytosterols. The term "saprophagous" is used in its conventional sense as referring to insects which feed on dead organic matter. The term "phytophagous" as used here in its conventional sense refers to insects which feed on living plants. The term "zoophagous" as used here in its conventional sense refers to insects which feed on living animals. The term "insect" as used here refers to the class Insecta of the phylum of joint-legged animals, the Arthropoda. The term "nymph" is used to refer to the early postembryonic developmental stages of an insect which undergoes gradual metamorphosis, i.e. development in which wings develop gradually as external pads. The term "larvae" is used to refer to the early developmental stage of an insect that undergoes complete metamorphosis, i.e. a development characterized by three distinctive postembryonic stages, the larval stage noting the early form in which the wing rudiments are developing internally. More detailed definitions and explanations of these terms can be found in the literature, for example in A Textbook of Entomology, Herbert H. Ross, 3rd ed., John Wiley & Sons, Inc., New York, 1967.

Insects which obtain their essential cholesterol through the dealkylation of dietary $C_{28}$ and $C_{29}$ phytosterols are those which when placed with the phytosterol will dealkylate it. The term "$C_{28}$ and $C_{29}$ phytosterols" is used here to refer to steroidal substances which are found in plants and which contain 28 or 29 carbon atoms, of which 9 or 10 carbon atoms are present in the 17-side chain. An illustration of the dealkylation of such phytosterols is the conversion of β-sitosterol to cholesterol which is depicted below.

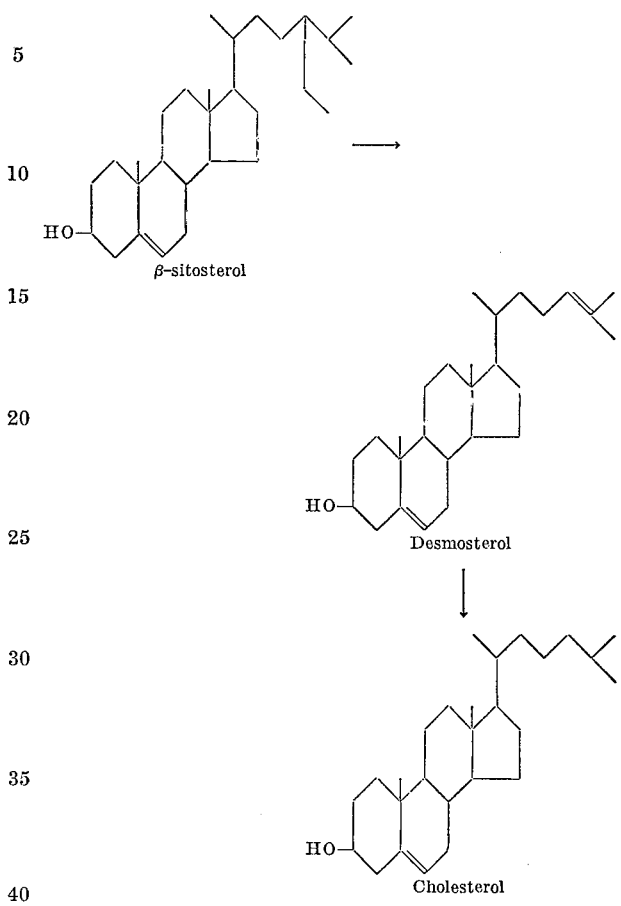

Insects of the type capable of dealkylating dietary $C_{28}$ and $C_{29}$ phytosterols are reported in the literature and can be characterized by the procedure of Life Sciences, 6, 395 (1967), which involves rearing the test insect on a stock diet coated with about 0.2% by dry weight of the desired sitosterol.

The hypocholesterolemic azasteroids of formula (I) inhibit the early postembryonic development stages of phytophagous insects which convert $C_{28}$ and $C_{29}$ phytosterols to cholesterol apparently by interfering with essential cholesterol biosynthesis and by disrupting other pathways of steroid metabolism. Such phytophagous insects include members of the order Lepidoptera, suborder Frenatae, family Sphingidae such as the tobacco hornworm [Manduca sexta (Johannson)]; family Noctuidae (Phalaenidae) such as the corn earworm [Heliothis zea (Boddie)] and the fall armyworm [Spodoptera frugiperda (J. E. Smith)]; and also family Pyralidae such as the Southwestern corn borer [Diatraea grandiosella]. Members of the order Coleoptera, family Curculionidae such as the boll weevil (Anthonomus grandis) are also representative of the types of phytophagous insects which can convert dietary $C_{28}$ and $C_{29}$ phytosterols to cholesterol.

Similarly, the manner in which the hypocholesterolemic azasteroids of formula (I) inhibit the early postembryonic developmental stages of saprophagous and zoophagous insects apparently involves disruption of essential steroid metabolism. Such saprophagous insects include members of the order Dictyoptera, family Blattidae such as the German cockroach [Blattella germanica (L.)] and the American cockroach [Periplaneta americana (L.)], as well as members of the order Isoptera, particularly termites; such as zoophagous insects include certain members of the order Diptera, suborder Nematocera, family Culicadae, particularly those of the genera Ano-

*pheles* and *Aedes* which transmit diseases such as yellow fever.

Inhibition of the early postembryonic developmental stages, i.e. larvae and nymphs, of the phytophagous, saprophagous and zoophagous insects named above is evidenced by disruption of molting (that is, the periodic shedding of an insect's cuticle or "skin"), premature formation of prepupae, inability to form pupae (the postembryonic form which follows the larval stage in insects which undergo complete metamorphosis), or similar manifestations of abnormal or retarded growth. The following is a description of the procedures employed in tests to determine the hypocholesterolemic, anti-larval and anti-nymphal activity of the azasteroids of formula (I).

HYPOCHOLESTEROLEMIC ASSAY

The anti-hypercholesterolemic utility of the instant compounds is evident from the results of a standardized test for their capacity to counteract the increased serum cholesterol induced in rats by ingestion of propylthiouracil. A group of 8 male rats each weighing 220–250 grams is used for each compound tested, propylthiouracil being administered by maintaining a concentration of 0.02% in the animals' drinking water throughout a 10-day period. Daily during that time, the selected dose of compound is dissolved or suspended in water or aqueous >30% propylene glycol and administered orally or subcutaneously to each animal. A corresponding group of 8 rats each concurrently and likewise receiving propylthiouracil and water or aqueous >30% propylene glycol but no compound serves as controls. On the 10th day, the surviving animals are anesthetized; and blood samples are taken from the abdominal aortas and analyzed for cholesterol. A compound is considered anti-hypercholesterolemic if the cholesterol levels in animals treated therewith are significantly (P<0.05 as determined by the Wilcoxon Rank Sum method) lower than the corresponding control levels.

TESTS WITH GERMAN COCKROACH NYMPHS

[*Blattella germanica* (L.)]

Twenty newly hatched German cockroach nymphs, *Blattella germanica* (Linnaeus), were transferred into a screened top half-pint jar. The jars contained a watering device consisting of a shell vial filled with 3% agar gel and diet prepared according to the method of Noland and Baumann [*Proc. Soc. Exptl. Biol. and Med* 70, 198 (1949)]. The test compound and β-sitosterol were coated on the diet with dichloromethane or methanol to achieve a concentration of each of 0.2% dry weight. To accurately assess the activity of the more potent test compounds, additional tests at other concentrations, e.g. 0.5%, were carried out as indicated by initial results. The insects were held at 25° C. and 50% R.H. (Relative Humidity) and the inhibitive effect was determined at the end of a 30-day period by comparing the weight of nymphs raised on the test compound with the weight of control nymphs.

TESTS WITH AMERICAN COCKROACH NYMPHS

[*Periplaneta americana* (L.)]

Thirty-five newly hatched American cockroach nymphs, *Periplaneta americana* (L.), were tested in the same manner as described above for German cockroach nymphs, except that the American cockroach nymphs were weighed at the end of an 80-day test period. Inhibitive effect of the test substance was determined in the same manner as for the German cockroach nymphs.

TESTS WITH TOBACCO HORNWORM LARVAE

[*Manduca sexta* (Johannson)]

Two or more groups of six newly-hatched tobacco hornworm larvae, *Manduca sexta* (Johannson), were reared using a modification of the method of Hoffman et al. [Insect Colonization and Mass Production, Academic Press, Inc., New York (1966)] based on the work of Waldbauer et al. [J. Econ. Entomol. 57, 93 (1964)]. The stock diet was coated with β-sitosterol and the test compound, each at a concentration of 0.026% wet weight (0.2% dry weight). Inhibition was rated as follows: O=no effect on development; ×=less than one-half of the insects develop to normal prepupae, larval growth retarded; ++=less than one-third of the insects develop to normal prepupae, some abnormal 4th instar prepupae formed (A "4th instar" is an insert in the period of development between the 3rd and 4th molt.); +++=less than one-sixth of the insects develop to normal prepupae, approximately one-third of the insects form abnormal 4th instar prepupae; and ++++=no development beyond abnormal 4th instar prepupae, considerable mortality during the first three larval molts.

TESTS WITH FALL ARMYWORM LARVAE

[*Spodoptera frugiperda* (J. E. Smith)]

Ten fall armyworm larvae were tested in the same manner as described above for tobacco hornworm larvae, except that the fall armyworm larvae were treated individually in plastic cups. Inhibition was rated as described for the tobacco hornworm larvae.

TESTS WITH CORN EARWORM LARVAE

[*Heliothis zea* (Boddie)]

Ten corn earworm larvae, *Heliothis zea* (Boddie), were tested in the same manner as described above for tobacco hornworm larvae, except that the corn earworm larvae were treated individually in plastic cups. Inhibition was rated as described for the tobacco horworm larvae.

TESTS WITH YELLOW FEVER MOSQUITO LARVAE

[*Aedes aegypti* (L.)]

Twenty newly hatched yellow fever mosquito larvae, *Aedes aegypti* (L.), were placed in 100 ml. of distilled water in a 150 ml. beaker. The test compounds, in 0.05 to 0.2 ml. of distilled acetone, were added to the water with thorough mixing at least 2 hours prior to the addition of larvae. The compounds were initially tested at 1.0 and 0.1 p.p.m. (part per million); those which gave 90% or greater inhibition at 0.1 p.p.m. were also tested at 0.01 p.p.m. The larvae were fed on micropulverized dog food (Gaines Dog Meal) and reared to maturity at 25° C. The inhibitory effect of the compounds on development was calculated from the number of treated larvae forming pupae and adults as compared with controls.

The minimum effective amount of active ingredient for inhibiting growth of larvae and nymphs lies at about 0.25 to 100 parts active ingredient per million parts food, dependent upon the compound selected, the crop and the insects to be controlled. Higher amounts can be applied as necessary.

Anti-larval and anti-nymphal compositions according to the invention are produced by known methods by thoroughly mixing the active substances of general formula (I) with suitable carriers. Suitable compositions include dusts, sprinkling agents, coated and impregnated granules, wettable powders, pastes, emulsions, solutions, aerosols, and the like.

To produce the solid compositions, the active substances are mixed with solid carriers or extending agents of organic or inorganic composition. Typical inorganic carriers include diatomaceous earth, fuller's earth, bentonite, talc, kieselguhr, bole, kaolin, tricalcium phosphate and calcium carbonate. Suitable organic extenders include ground vegetable products such as bran, bark dust, sawdust, ground nutshells and the like. Each of these carriers can be used alone or admixed with each other.

In addition to the solid carrier and the active ingredient, these compositions can also contain substances which stabilize the active ingredient and/or surface active substances which improve the adhesion of the active ingredients on plants and parts thereof and attain better wettability and dispersability of the active ingredient.

The concentrates of active substances which can be dispersed in water (i.e. wettable powders), pastes and emulsion concentrates consist of the active substance and solid carrier, and may optionally also contain stabilizers, surface active substances, antifoaming agents and solvents. Wettable powders and pastes are obtained by mixing and milling the active substances with dispersing agents and pulverulent carriers until a homogeneous mixture is obtained. The active substances are so mixed, milled, sieved and strained with the dispersing agents and carriers that the solid particle size in wettable powders is of the order of 0.02 to 0.04 mm. and in pastes is 0.003 mm. or less. To produce emulsion concentrates and pastes, dispersing agents, organic solvents and water are used. Examples of solvents are benzene, toluene, xylene, alcohols, dimethyl sulfoxide and mineral oil fractions. The solvents should of course not be phytotoxic.

Additionally, the compositions according to the invention can be used in the form of solutions. For this purpose, the compound of formula (I) is dissolved in a suitable organic solvent, a mixture of solvents or in water. Aliphatic and aromatic hydrocarbons and chlorinated derivatives thereof are examples of organic solvents which may be employed.

The compositions according to the invention which are described above can, to broaden the range of action, be mixed with, for example, insecticides, fungicides, bactericides, fungistatics, bacteriostatics, nematocides or fertilizers. In addition, the active compositions can be used with attractants and baits.

The following Examples, which illustrate the preparation of the compounds of this invention, are given by way of illustration only. In these Examples, temperatures are given in degrees Centigrade (° C.) and quantities of materials are given in parts by weight, unless otherwise noted. The relationship between parts by weight and parts by volume is the same as that existing between grams and milliliters. Specific rotations were determined using the D line of sodium (5893A) as the wavelength of light. Nuclear magnetic resonance spectra were determined on a 60 mega-Hertz instrument using tetramethylsilane as an internal reference, and are indicated in Hertz (HZ). Infrared absorption maxima are given in microns ($\mu$).

EXAMPLE 1

To a mixture of 288 parts of 3$\beta$-hydroxyandrost-5-en-17-one and about 2450 parts of pyridine there was added, with stirring and cooling in a cold water bath, 177 parts of 3-cyclopentylpropionyl chloride. The mixture was stirred with cooling for about one and one-half hours, then 15 parts more of 3-cyclopentylpropionyl chloride was added and the resulting mixture was stirred for an additional one-half hour. Aqueous methanol was added to the reaction mixture, which was then cooled at about 5° C., resulting in precipitation of needle-like crystals. The crystals were collected, dried in air, and then recrystallized from methanol to afford 3$\beta$-(3-cyclopentylpropionyloxy)androst-5-en-17-one, melting at about 104–105° C.

Substitution of molecular equivalent quantities of the appropriate acyl chloride for the 3-cyclopentylpropionyl chloride used above and substantial repetition of the above procedure afforded 3$\beta$-(2-cyclohexylethanoyloxy)androst-5-en-17-one, 3$\beta$ - (3 - cyclobutylpropionyloxy)androst-5-en-17-one, and 3$\beta$ - (4-cyclopentylbutyryloxy)androst-5-en-17-one.

EXAMPLE 2

A mixture of 290 parts of 3$\beta$-(3-cyclopentylpropionyloxy)androst-5-en-17-one, 107 parts of 3-dimethylaminopropylamine and about 3,900 parts of benzene was warmed to drive off residual water. To that mixture there was then added 13 parts of p-toluenesulfonic acid monohydrate. The resulting solution was heated at reflux temperature for about seven hours, then the solvent was removed by evaporation to leave an oil which solidified on standing. The oil was recrystallized from ethyl acetate to afford 17-[N-(3-dimethylaminopropyl)imino]androst-5-en - 3$\beta$-ol 3-(3-cyclopentylpropionate), melting at about 84–86° C.

To 33 parts of the imine prepared above, there were added 16 parts of sodium borohydride and 240 parts of methanol over a period of about one-half hour, while the mixture was stirred at room temperature and cooled in a water bath. Water was added to decompose the excess sodium borohydride, and the reaction mixture was extracted with ether. The ether extract was washed three times with water, then dried over sodium sulfate and evaporated to dryness to afford a solid which was recrystallized from acetone. There was thus obtained 17$\beta$-[N-(3-dimethylaminopropyl)amino]androst-5-en-3$\beta$-ol 3-(3-cyclopentylpropionate), melting at about 76–78° C.

A mixture of about 30 parts of 17$\beta$-[N-(3-dimethylaminopropyl)amino]androst-5-en-3$\beta$-ol 3-(3-cyclopentylpropionate), about 37 parts of formic acid and about 30 parts by volume of a 36:64 by volume solution of formaldehyde and water was heated on a steam bath for one hour, then was allowed to stand for two days at room temperature. At the end of that period, about 100 parts of aqueous methanol was added to the reaction mixture with cooling and stirring in an icebath. The resulting mixture was neutralized with aqueous sodium hydroxide, then 10% aqueous sodium carbonate was added to make the solution basic. The basic solution was extracted with ethyl ether, and the extract was washed with water and then dried over an anhydrous mixture of sodium sulfate and charcoal. The solution was decanted from the solids, then evaporated in vacuo, to afford 17$\beta$-[N-methyl-N-(3-dimethylaminopropyl)amino]androst - 5 - en-3$\beta$-ol 3-(3-cyclopentylpropionate), melting at about 89–91° C. Treatment of that free base in ethyl ether with isopropanolic hydrogen chloride afforded 17$\beta$-[N-methyl-N-(3-dimethylaminopropyl)amino]androst-5-en-3$\beta$-ol 3-(3-cyclopentylpropionate) hydrochloride.

EXAMPLE 3

Substitution of molecular equivalent quantities of the appropriate amine for the 3-dimethylaminopropylamine used in the first paragraph of Example 2 and substantial repetition of the successive procedures detailed in the first and second paragraphs of that Example afforded 17$\beta$-[N-(3 - diethylaminopropyl)amino]androst-5-en-3$\beta$-ol 3-(3-cyclopentylpropionate), 17$\beta$-[N-(3-dipentylaminopropyl)amino]androst - 5-en-3$\beta$-ol 3-(3-cyclopentylpropionate), and 17$\beta$-[N-(2-dimethylaminoethyl)amino]androst-5-en-3$\beta$-ol 3-(3-cyclopentylpropionate).

EXAMPLE 4

Substitution of molecular equivalent quantities of the appropriate 17$\beta$-[N-dialkylaminoalkyl)amino steroid for the 17$\beta$ - [N-(3-dimethylaminopropyl)amino]androst-5-en-3$\beta$-ol 3-(3-cyclopentylpropionate) used in the third paragraph of Example 2 and substantial repetition of the procedure detailed therein resulted in 17$\beta$-[N-methyl-N-(3 - diethylaminopropyl)amino]androst-5-en-3$\beta$-ol 3-(3-cyclopentylpropionate), 17$\beta$ - [N-methyl-N-(3-dipentylaminopropyl)amino]androst-5-en-3$\beta$-ol 3-(3-cyclopentylpropionate), and 17$\beta$ - [N-methyl-N-(2-dimethylaminoethy)amino]androst - 5-en-3$\beta$-ol 3(3-cyclopentylpropionate).

EXAMPLE 5

The diethyl ketal of cyclopentanone was prepared by reacting 78 parts of cyclopentanone with 144 parts of triethylformate in 138 parts of ethanol, containing 2% dry hydrogen chloride, at room temperature for about 24 hours. 30 Parts by volume of pyridine was added, followed by a 1:1 by volume mixture of ether and benzene. The mixture was washed with a solution of 15 parts of sodium hydroxide in 300 parts of water, then was washed with water and dried over anhydrous sodium sulfate. The solvent was removed under reduced pressure and the product was distilled at 79–80° C. at a pressure of approximately 30 millimeters of mercury.

A mixture of 4 parts of 3β-hydroxyandrost-5-en-17-one, 0.04 part of p-toluenesulfonic acid and about 1440 parts of benzene was heated to the reflux temperature and heating was continued until about 180 parts of benzene was removed by distillation. To that mixture, there was then added 9 parts of cyclopentanone diethyl ketal and distillation was continued until about 620 parts of benzene was collected. The reaction mixture was cooled, about 4 parts of pyridine was added and the resulting mixture was concentrated *in vacuo* to leave an oil. The oil, which was 3β-(1-cyclopentenyloxy)androst-5-en-17-one, was recrystallized from methanol containing a small amount of pyridine.

3.15 Parts of 3β-(1-cyclopentenyloxy)androst-5-en-17-one was dissolved in tetrahydrofuran and the resulting solution was reacted with hydrogen gas in the presence of 0.8 parts of 5% palladium on aluminum oxide catalyst at atmospheric temperature and pressure until the theoretical amount of hydrogen was taken up. The tetrahydrofuran was removed *in vacuo* to leave an oil which solidified on standing. The oil was recrystallized, first from aqueous methanol and then from methanol alone, to afford 3β-cyclopentyloxyandrost-5-en-17-one, melting at 158–162° C.

A mixture of 13 parts of 3β-cyclopentyloxyandrost-5-en-17-one, 8 parts of 3-dimethylaminopropylamine, 1.5 parts of p-toluenesulfonic acid monohydrate and 234 parts of anhydrous benzene was refluxed for about seven hours, then the solvent was removed *in vacuo* to leave crystals of 17 - [N-(3-dimethylaminopropyl)imino]androst-5-en-3β-ol 3-cyclopentyl ether. That compound is characterized by infrared maxima in chloroform solution at about 3.4, 6.1, and 9.25μ and by a specific rotation (in chloroform at 25° C.) of −24.78°.

To a mixture of about 16 parts of 17-[N-(3-dimethylaminopropyl)amino]androst - 5-en - 3β-ol 3-cyclopentyl ether and 400 parts of methanol there was added 10 parts of sodium borohydride over a period of about one-half hour with stirring and cooling in a water bath. Stirring was continued for an additional one-half hour. Water was added to decompose excess sodium borohydride and the reaction mixture was then extracted with ether. The ether extract was washed three times with water, then dried over anhydrous sodium sulfate. Evaporation of the solvent to dryness afforded, as a solid, 17β-[N-(3-dimethylaminopropyl)amino]androst - 5-en-3β-ol 3-cyclopentyl ether. That compound is characterized by infrared maxima in chloroform solution at about 3.4 and 9.25μ and by a specific rotation (in chlorofrom at 26° C.) of −28.6°.

A mixture of 10 parts of 17β-[N-(3-dimethylaminopropyl)amino]androst-5-en-3β-ol 3-cyclopentyl ether, 10 parts by volume of aqueous 37% formaldehyde and 12 parts of formic acid was heated for about sixteen hours on a steam bath. At the end of that time, aqueous methanol was added and the mixture was made basic with aqueous sodium hydroxide, then cooled at about 5° C. The resultant precipitate was washed with water, dried in air, then recrystallized from acetone to afford 17β-[N - methyl-N-(3-dimethylaminopropyl)amino]androst-5-en-3β-ol 3-cyclopentyl ether. That compound is characterized by infrared maxima in chloroform at 3.4 and 9.25 μ, and by a specific rotation (in chloroform at 25° C.) of −37.9°.

EXAMPLE 6

Substitution of a molecular equivalent quantity of the appropriate acyl chloride for the 3-cyclopentylpropionyl chloride used in Example 1 and substantial repetition of the successive procedures detailed in Examples 1 and 2 afforded 17β - [N - methyl-N-(3-dimethylaminopropyl)androst-5-en-3β-ol 3 - cyclopentylcarboxylate, 17β-[N-methyl - N - (3-dimethylaminopropyl)amino]androst-5-en-3β-ol 3-cyclohexylcarboxylate, and 17β-[N-methyl-N-(3 - dimethylaminopropyl)amino]androst-5-en-3β-ol 3-cycloheptylcarboxylate.

EXAMPLE 7

Substitution of molecular equivalent quantities of the appropriate acyl chloride for the 3-cyclopentylpropionyl chloride used in Example 1 and substantial repetition of the successive procedures described in Examples 1 and 2 afforded 17β-[N-methyl-N-(3 - dimethylaminopropyl)amino]androst-5-en-3β-ol 3-(3-cyclobutylpropionate) and 17β-[N-methyl - N - (3 - dimethylaminopropyl)amino]androst-5-en-3β-ol 3-(3-cyclohexylpropionate).

EXAMPLE 8

Substitution of a molecular equivalent quantity of 24-dimethylaminochol-5-en-3β-ol (commonly termed "25-azacholesterol") for the 3β-hydroxyandrost-5-en-17-one used in the procedure of the first paragraph of Example 1 and repetition of the procedure described in that Example afforded 24-dimethylaminochol-5-en-3β-ol 3-(3-cyclopentylpropionate).

Similarly, substitution of an equivalent quantity of 17β-[N - methyl-N-(3-dimethylaminopropyl)amino]androst-5-en-3β-ol for the 3β-hydroxyandrost-5-en-17one used in the procedure of the first paragraph of Example 1 and repetition of the procedure detailed therein afforded 17β-[N-methyl - N - (3-dimethylaminopropyl)amino]androst-5-en-3β-ol 3-(3-cyclopentylpropionate).

EXAMPLE 9

Substitution of an equivalent quantity of 24-dimethylaminochol - 5 - en-3β-ol (commonly termed "25-azacholesterol") for the 3β-hydroxyandrost-5-en-17-one used in the procedure of the second paragraph of Example 5 and substantial repetition of the procedures detailed in the second and third paragraphs of that Example afforded 24-dimethylaminochol-5-en-3β-ol 3-cyclopentyl ether.

In a similar manner, substitution of an equivalent quantity of 17β-[N-methyl-N-(3-dimethylaminopropyl)amino]androst-5-en-3β-ol for the 3β-hydroxyandrost-5-en-17-one used in the procedure of the second paragraph of Example 5 and substantial repetition of the procedures detailed in the second and third paragraphs of that Example afforded 17β-[N-methyl-N-(3-dimethylaminopropyl)amino]androst-5-en-3β-ol 3-cyclopentyl ether.

EXAMPLE 10

A mixture of 6.8 parts of 3β-methoxyandrost-5-en-17 one, 3.96 parts of 2-dimethylaminoethylamine, 0.86 part of p-toluenesulfonic acid monohydrate and 220 parts of anhydrous benzene was heated at the reflux temperature for about 16 hours, water being distilled off as formed. The resultant mixture was concentrated under reduced pressure, affording, as a crude residue, 17-[N-(2-dimethylaminoethyl)imino]androst-5-en-3β-ol 3-methyl ether.

The crude material obtained above was dissolved in 200 parts of methanol and 7.0 parts of sodium borohydride was added over a period of about one hour. The resultant mixture was allowed to stand overnight, then was concentrated under reduced pressure and partitioned between ether and water. The ether layer was separated and washed twice with water, then dried over anhydrous potassium carbonate and concentrated under reduced pressure. There was thus obtained, as an oil which solidified on standing, 17β-[N-(2-dimethylaminoethyl)amino]

androst-5-en-3β-ol 3-methyl ether. That compound has characteristic nuclear magnetic resonance bands, in deuterochloroform, at about 44, 60, 132, 200, and 320 Hz.

7.5 Parts of 17β-[N-(2-dimethylaminoethyl)amino] androst-5-en-3β-ol 3-methyl ether, 50 parts by volume of aqueous 88% formic acid and 50 parts by volume of aqueous 36% formaldehyde were combined and heated on a steam bath for 3 hours. At the end of that time, the mixture was concentrated under reduced pressure, then partitioned between water and ether and made alkaline with a concentrated sodium hydroxide solution containing crushed ice. The resultant mixture was extracted with ether and the ether extract was dried over anhydrous potassium carbonate and concentrated under reduced pressure. The oil thus obtained was 17β-[N-methyl-N-(2-dimethylaminoethyl)amino]androst-5-en-3β-ol 3 - methyl ether. That product exhibits characteristic nuclear magnetic resonance bands, in deuterochloroform, at about 48, 60, 134, 201 and 322 Hz.

8.3 Parts of 17β-[N-methyl-N-(2-dimethylaminoethyl) amino]androst-5-en-3β-ol 3-methyl ether was dissolved in about 20 parts of anhydrous ethanol. 2-Propanol containing a slight excess of hydrogen chloride was added, and crystals began to form. Ether was added and the mixture was cooled to about 0° C., then filtered, washed thoroughly with ether and dried to give 17β-[N-methyl-N-(2-dimethylaminoethyl)amino]androst - 5 - en-3β-ol 3-methyl ether dihydrochloride. That amorphous material, on exposure to air, absorbed one mole of water, thus affording 17β - [N - methyl-N-(2-dimethylaminoethyl) amino]androst-5-en-3β-ol 3-methyl ether dihydrochloride monohydrate, melting at about 272° C. with gas evolution. That compound is characterized also by infrared absorption maxima in a potassium bromide disc at about 2.9, 3.4, 3.5, 3.8, 4.0, 6.8 and 7.2μ.

EXAMPLE 11

A mixture of 6.8 parts of 3β-methoxyandrost-5-en-17-one, 4.6 parts of 3-dimethylaminopropylamine, 0.86 part of p-toluenesulfonic acid monohydrate and 220 parts of anhydrous benzene was heated at the reflux temperature for about 16 hours, water being distilled off as formed. The resultant mixture was concentrated under reduced pressure, affording crude 17-[N-(3-dimethylaminopropyl) imino]androst-5-en-3β-ol-3-methyl ether.

The crude residue obtained above was dissolved in 200 parts of methanol and 7.0 parts of sodium borohydride was added over a period of about one hour. The resultant mixture was allowed to stand overnight, then was concentrated under reduced pressure and partitioned between ether and water. The ether layer was separated and washed with water, then dried over anhydrous potassium carbonate and concentrated under reduced pressure. There was thus obtained, as an oil, 17β-[N-(3-dimethylaminopropyl)amino]androst-5-en-βB-ol 3-methyl ether.

7.8 Parts of the above-prepared 17β-[N-(3-dimethylaminopropyl)amino]androst-5-en-3β-ol 3-methyl ether, 50 parts by volume of aqueous 88% formic acid and 50 parts by volume of aqueous 36% formaldehyde were combined and heated on a steam bath for 3 hours. At the end of that time, the mixture was concentrated under reduced pressure, then partitioned between water and ether and made alkaline with a concentrated sodium hydroxide solution containing crushed ice. The resultant mixture was extracted with ether and the ether extract was dried over anhydrous potassium carbonate and concentrated under reduced pressure. There was thus obtained as an oil, 17β-[N-methyl-N-(3 - dimethylaminopropyl)amino]androst-5-en-3β-ol 3-methyl ether. That products exhibits characteristic nuclear magnetic resonance bands, in deuterochloroform, at about 48, 60, 132, 200 and 322 Hz.

9.4 Parts of 17β-[N-methyl-N-(3-dimethylaminopropyl)amino]androst-5-en-3β-ol 3-methyl ether was dissolved in about 20 parts of anhydrous ethanol. 2-Propanol containing a slight excess of hydrogen chloride was added, and crystals began to form. Ether was added and the mixture was cooled to about 0° C., then filtered, washed thoroughly with ether and dried to give 17β-[N-methyl-N-(3 - dimethylaminopropyl)amino]androst-5-en-3β-ol 3-methyl ether dihydrochloride. That amorphous material, on exposure to air, absorbed one mole of water, thus affording 17β-[N-methyl - N - (3-dimethylaminopropyl) amino]androst-5-en-3β-ol 3-methyl ether dihydrochloride monohydrate, melting at about 281° C. with gas evolution. That compound is characterized also by infrared absorption maxima at about 2.9, 3.4, 3.5, 3.7, 4.0 and 6.8μ, as determined in a potassium bromide disc.

EXAMPLE 12

A mixture of 3 parts of 24-dimethylamino-5α-cholan-3β-ol, 0.04 par of p-toluenesulfonic acid and about 1440 parts of benzene was heated to the reflux temperature and maintained at that temperature until about 180 parts of benzene was removed by distillation. 9 Parts of cyclopentanone diethyl ketal was added and distillation was continued until about 620 parts of benzene was collected. The reaction mixture was then cooled, about 4 parts of pyridine was added and the mixture was concentrated under reduced pressure. The residue, namely 24-dimethylamino-5α-cholan-3β-ol 3-(1-cyclopentenyl)ether, was recrystallized from methanol containing a small amount of pyridine.

3.15 Parts of 24-dimethylamino-5α-cholan-3β-ol 3-(1-cyclopentenyl)ether was dissolved in tetrahydrofuran and the resulting solution was reacted with hydrogen gas in the presence of 0.8 part of 5% palladium on aluminum oxide catalyst at atmospheric pressure and room temperature until the theoretical amount of hydrogen was taken up. The tetrahydrofuran was removed under reduced pressure, thus affording 24-dimethylamino-5α-cholan-3β-ol 3-cyclopentyl ether.

EXAMPLE 13

A mixture containing 10 parts of 3β-methoxychol-5-en-24-ic acid methyl ester, 10 parts of hydrazine hydrate, and 200 parts of 1-pentanol was heated at the reflux temperature for approximately 44 hours. The solvent was removed by vacuum distillation and the residue was dissolved in anhydrous ethanol. Water was added and the crystals which formed were filtered and washed with a mixture of ethanol and water. There was thus obtained 3β-methoxychol-5-en-24-ic acid hydrazide, which sinters starting at about 156° C. and melts at about 137–6° C.

5 Parts of 3β-methoxychol-5-en-24-ic acid hydrazide was dissolved in a mixture of 16.5 parts of glacial acetic acid and 22 parts of methylene chloride. The resultant mixture was cooled to about −10° C. A solution containing 2.6 parts of sodium nitrite and 8.5 parts of water was added in one portion and the reaction mixture was shaken vigorously for several minutes. The reaction mixture was then allowed to stand at approximately 0° C. for about 30 minutes. A mixture containing 133 parts of methylene chloride and 540 parts of a 1.5 N sodium carbonate solution was then added and the resultant mixture was shaken. The organic layer was separated and dried, first over anhydrous sodium sulfate and then over anhydrous calcium chloride. Methylene chloride was removed from the reaction mixture by distillation at atmospheric pressure and was simultaneously replaced with dry benzene until the distillate boiled at about 75° C. The solution was then heated at the reflux temperature until the evolution of nitrogen gas had ceased. The resultant mixture was cooled to about 25° C. and 3 parts by volume of aqueous 36% hydrochloric acid was added. The reaction mixture was then stirred vigorously until the evolution of carbon dioxide had ceased. The desired product, namely 23-amino-24-norchol-5-en-3β-ol 3-methyl ether hydrochloride, crystallized from the solution and was filtered, air-dried, and then recrystallized from a mixture of ethanol and anhydrous ether. That product melted at about 315° C. with gas evolution.

The free base of 23-amino-24-norchol-5-en-3β-ol 3-methyl ether was prepared by suspending 23-amino-24-norchol-5-en-3β-ol 3-methyl ether hydrochloride in a mixture of water and benzene, alkalizing that suspension with aqueous sodium hydroxide, separating the organic layer, drying over anhydrous potassium carbonate and removing benzene under reduced pressure. There was thus obtained 23-amino-24-norchol-5-en-3β-ol 3-methyl ether, which sinters starting at 108° C. and melts at 111–4° C.

A mixture containing 1 part of 23-amino-24-norchol-5-en-3β-ol 3-methyl ether, 15 parts by volume of aqueous 88% formic acid and 15 parts by volume of aqueous 36% formaldehyde was heated at about 100° C. for approximately 5 hours. The mixture was then poured onto ice and benzene and made alkaline with aqueous sodium hydroxide. The organic layer was separated and dried over anhydrous potassium carbonate and the solvent was removed by distillation under reduced pressure. The resultant oil was dissolved in anhydrous ethanol, and 2-propanol containing a slight excess of hydrogen chloride was added. The solid thus obtained was recrystallized from a mixture of anhydrous ethanol and anhydrous ether. The product, 23-dimethylamino-24-norchol-5-en-3β-ol 3-methyl ether hydrochloride, melts at about 290° C. with gas evolution.

What is claimed is:

1. The method of inhibiting the growth of larvae and nymphs of the tobacco hornworm which comprises the oral administration to said larvae and nymphs of an amount effective to inhibit the growth of said larvae and nymphs of a compound selected from the group consisting of 17β - [N-methyl-N-(3-dimethylaminopropyl)amino]androst - 5 - en-3β-ol, 3-(3-cyclopentylpropionate); 17β-[N-methyl - N - (3 - dimethylaminopropyl)amino] androst-5-en-3β-ol 3-cyclopentyl ether; 24-dimethylaminochol-5-en-3β-ol 3-cyclopentyl ether; and 24-dimethylaminochol-5-en-3β-ol 3-methyl ether.

References Cited

UNITED STATES PATENTS 3,326,758    6/1967    Irmscher et al.   ------ 424—238

OTHER REFERENCES

Svoboda et al., Science, Vol. 156, pp. 1637–1638, 1967.

RICHARD L. HUFF, Primary Examiner